US009419889B2

(12) United States Patent
Xiao et al.

(10) Patent No.: US 9,419,889 B2
(45) Date of Patent: Aug. 16, 2016

(54) METHOD AND SYSTEM FOR DISCOVERING A PATH OF NETWORK TRAFFIC

(71) Applicant: Nicira, Inc., Palo Alto, CA (US)

(72) Inventors: Jun Xiao, Beijing (CN); Romain F. Lenglet, Mountain View, CA (US)

(73) Assignee: Nicira, Inc., Palo Alto, CA (US)

( * ) Notice: Subject to any disclaimer, the term of this patent is extended or adjusted under 35 U.S.C. 154(b) by 96 days.

(21) Appl. No.: 14/200,752

(22) Filed: Mar. 7, 2014

(65) Prior Publication Data

US 2015/0256448 A1    Sep. 10, 2015

(51) Int. Cl.
| | |
|---|---|
| *H04L 12/26* | (2006.01) |
| *H04J 3/14* | (2006.01) |
| *H04L 12/721* | (2013.01) |
| *H04L 12/741* | (2013.01) |
| *H04L 12/701* | (2013.01) |
| *H04L 12/803* | (2013.01) |

(52) U.S. Cl.
CPC ............... *H04L 45/26* (2013.01); *H04L 45/00* (2013.01); *H04L 45/74* (2013.01); *H04L 47/125* (2013.01)

(58) Field of Classification Search
CPC ...................................................... H04L 43/10
See application file for complete search history.

(56) References Cited

U.S. PATENT DOCUMENTS

| | | | |
|---|---|---|---|
| 5,224,100 A | 6/1993 | Lee et al. | |
| 5,245,609 A | 9/1993 | Ofek et al. | |
| 5,265,092 A | 11/1993 | Soloway et al. | |
| 5,729,685 A | 3/1998 | Chatwani et al. | |
| 5,781,534 A | 7/1998 | Perlman et al. | |
| 5,926,463 A | 7/1999 | Ahearn et al. | |
| 6,104,700 A | 8/2000 | Haddock et al. | |
| 6,430,160 B1 | 8/2002 | Smith et al. | |
| 6,721,334 B1 | 4/2004 | Ketcham | |
| 7,079,544 B2 | 7/2006 | Wakayama et al. | |
| 7,627,692 B2 | 12/2009 | Pessi | |
| 7,706,266 B2 | 4/2010 | Plamondon | |
| 7,760,735 B1 | 7/2010 | Chen et al. | |
| 7,808,919 B2 | 10/2010 | Nadeau et al. | |
| 7,937,492 B1 | 5/2011 | Kompella et al. | |

(Continued)

FOREIGN PATENT DOCUMENTS

| | | |
|---|---|---|
| JP | 2002-141905 | 5/2002 |
| WO | WO 95/06989 | 3/1995 |

(Continued)

OTHER PUBLICATIONS

International Search Report and Written Opinion of PCT/US2014/072861, Apr. 29, 2015 (mailing date), Nicira, Inc.

(Continued)

*Primary Examiner* — Maharishi Khirodhar

(57) ABSTRACT

Methods and systems for discovering a path of network traffic that travels from a source host to a destination host are disclosed. A method involves, at the source host, generating probe packets that have the same load balancing parameters as packets of an application that generates application packets for transmission from the source host to the destination host and a path discovery signature comprised of bits from at least one of the network layer header and the transport layer header. The method also involves transmitting the probe packets from the source host to the destination host. In some embodiments, the steps of the method are performed when program instructions contained in a computer-readable storage medium are executed by one or more processors.

18 Claims, 16 Drawing Sheets

(56) References Cited

U.S. PATENT DOCUMENTS

| | | | |
|---|---|---|---|
| 8,345,558 | B2 | 1/2013 | Nicholson et al. |
| 8,351,418 | B2 | 1/2013 | Zhao et al. |
| 8,611,351 | B2 | 12/2013 | Gooch et al. |
| 2005/0132044 | A1 | 6/2005 | Guingo et al. |
| 2005/0232230 | A1 | 10/2005 | Nagami et al. |
| 2006/0013142 | A1* | 1/2006 | Hongal ............ H04L 12/462 370/248 |
| 2006/0028999 | A1 | 2/2006 | Iakobashvilli et al. |
| 2006/0029056 | A1 | 2/2006 | Perera et al. |
| 2006/0037075 | A1 | 2/2006 | Frattura et al. |
| 2006/0206655 | A1 | 9/2006 | Chappell et al. |
| 2006/0282895 | A1 | 12/2006 | Rentzis et al. |
| 2007/0055789 | A1 | 3/2007 | Claise et al. |
| 2008/0049614 | A1 | 2/2008 | Briscoe et al. |
| 2008/0049786 | A1 | 2/2008 | Ram et al. |
| 2009/0010254 | A1 | 1/2009 | Shimada |
| 2010/0128623 | A1 | 5/2010 | Dunn et al. |
| 2011/0317696 | A1 | 12/2011 | Aldrin et al. |
| 2012/0110152 | A1* | 5/2012 | Wing ............ H04L 12/4633 709/223 |
| 2012/0159454 | A1 | 6/2012 | Barham et al. |
| 2012/0287791 | A1* | 11/2012 | Xi ............ H04L 43/0882 370/237 |
| 2013/0067067 | A1 | 3/2013 | Miri et al. |
| 2013/0332602 | A1 | 12/2013 | Nakil et al. |
| 2014/0029451 | A1 | 1/2014 | Nguyen |
| 2014/0119203 | A1 | 5/2014 | Sundaram et al. |
| 2014/0195666 | A1 | 7/2014 | Dumitriu et al. |
| 2014/0281030 | A1 | 9/2014 | Cui et al. |

FOREIGN PATENT DOCUMENTS

| | | |
|---|---|---|
| WO | WO 2013/184846 | 12/2013 |
| WO | PCT/US2014/072861 | 12/2014 |

OTHER PUBLICATIONS

Phaal, Peter, et al., "sFlow Version 5," Jul. 2004, 46 pages, sFlow.org.

Phan, Doantam, et al., "Visual Analysis of Network Flow Data with Timelines and Event Plots," month unknown, 2007, pp. 1-16, VizSEC.

Augustin, Brice et al.; "Avoiding traceroute anomalies with Park traceroute"; IMC '06, Oct. 25-27, 2006; Brazil; 6 pgs.; 2006.

Augustin, Brice et al.; "Multipath tracing with Paris traceroute"; IEEE; 8 pgs.; 2007.

\* cited by examiner

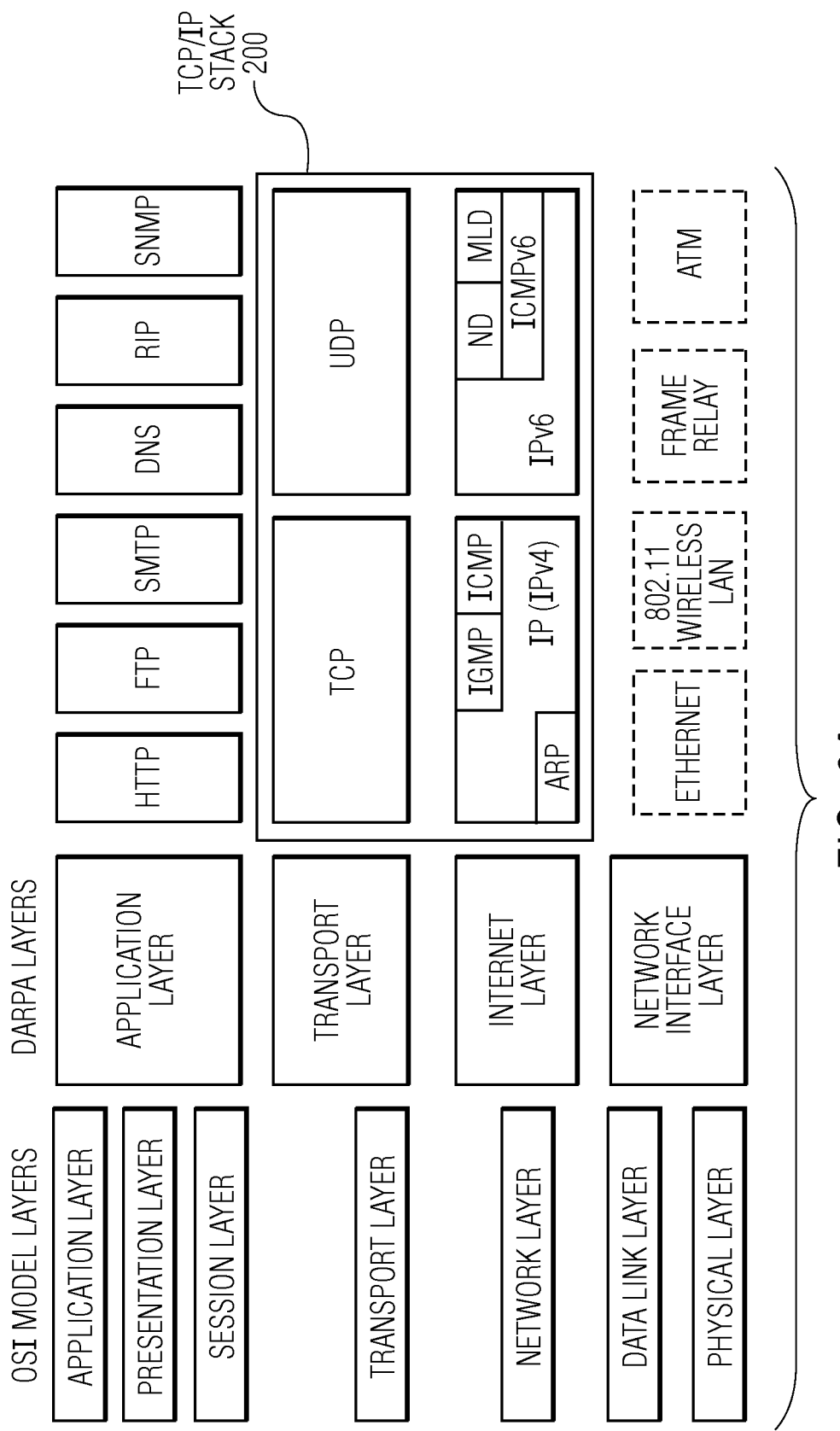

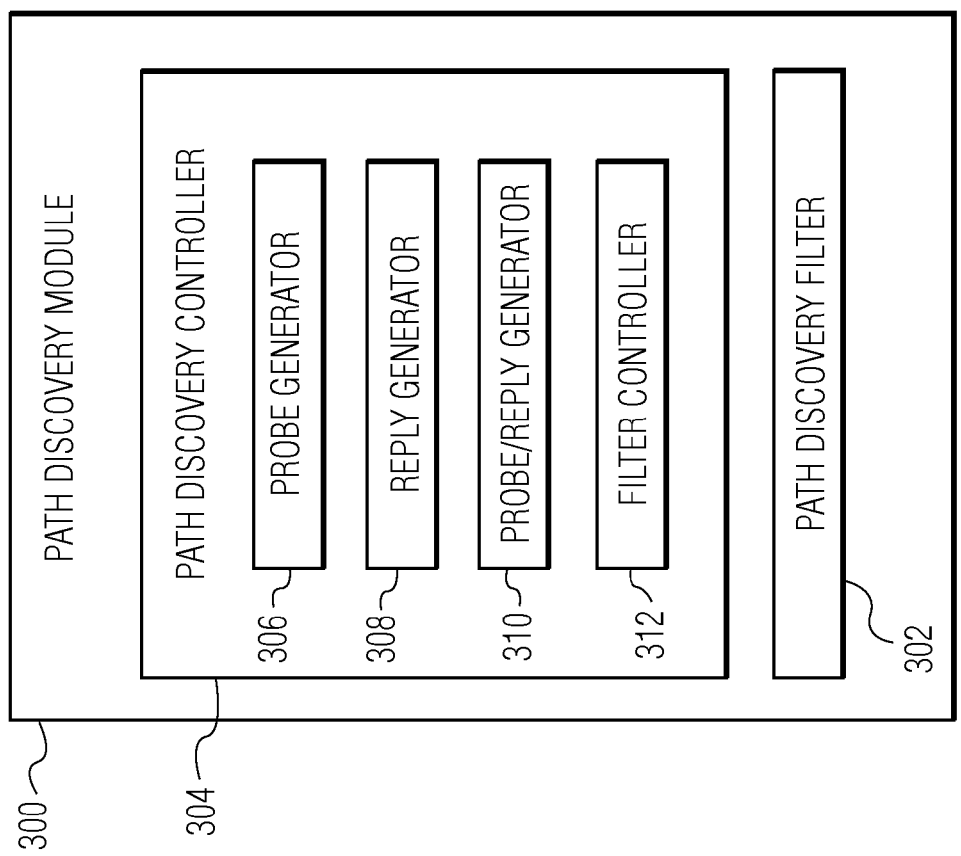

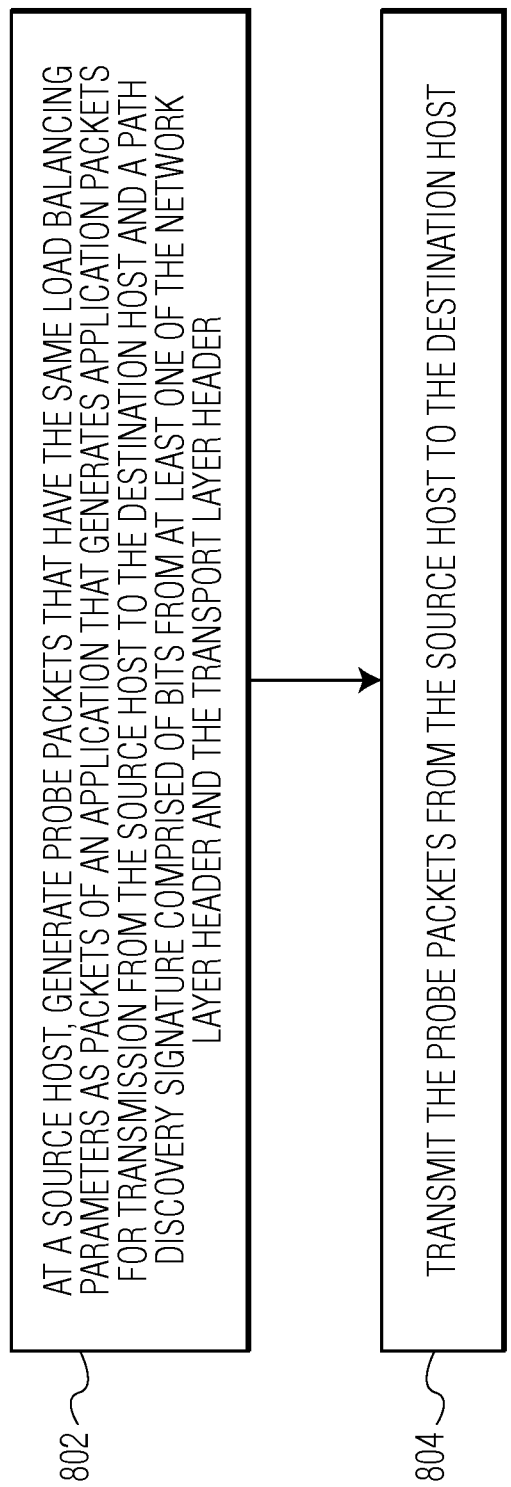

FIG. 8

802 — AT A SOURCE HOST, GENERATE PROBE PACKETS THAT HAVE THE SAME LOAD BALANCING PARAMETERS AS PACKETS OF AN APPLICATION THAT GENERATES APPLICATION PACKETS FOR TRANSMISSION FROM THE SOURCE HOST TO THE DESTINATION HOST, AND A PATH DISCOVERY SIGNATURE COMPRISED OF BITS FROM AT LEAST ONE OF THE NETWORK LAYER HEADER AND THE TRANSPORT LAYER HEADER

804 — TRANSMIT THE PROBE PACKETS FROM THE SOURCE HOST TO THE DESTINATION HOST

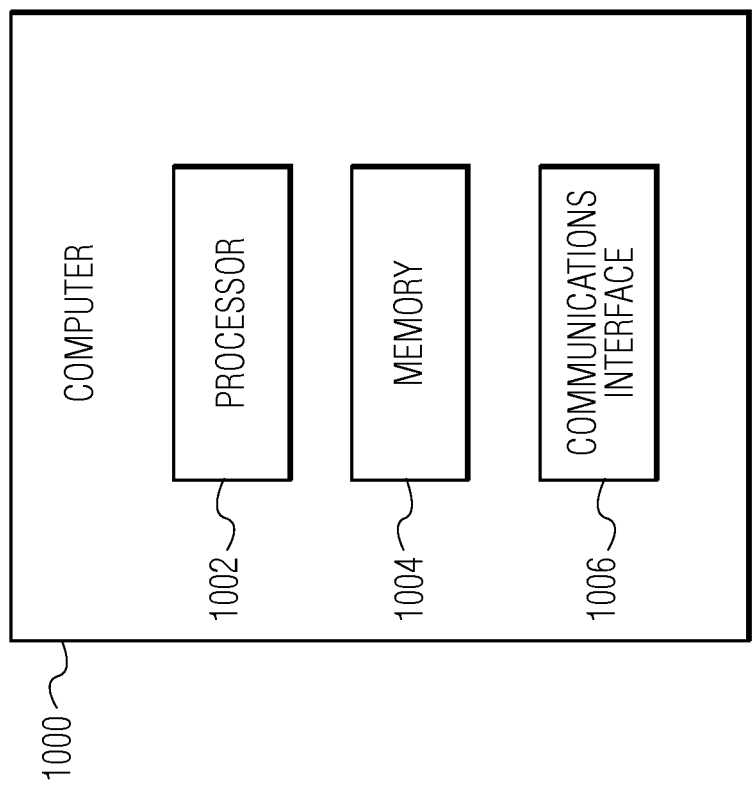

METHOD AND SYSTEM FOR DISCOVERING A PATH OF NETWORK TRAFFIC

BACKGROUND

In many instances, it is desirable to learn the path that network traffic takes between a source host and a destination host. A well-known path discovery tool, referred to as "traceroute," can be used to learn the path that network traffic takes between a source host and a destination host. Although traceroute works well in simple networks, complications can arise in more complex networks that have multiple different possible paths between the source host and the destination host and that employ load balancing routers to distribute traffic amongst the different paths. Another tool, referred to as "Paris traceroute," can be used to enumerate all of the possible paths between a source host and a destination host. Although Paris traceroute works well to enumerate all of the possible paths between a source host and a destination host, Paris traceroute does not specify which particular path, amongst the multiple possible paths, will be traveled by specific packets that are generated from a user application such as HTTP that operates at, for example, the application layer.

SUMMARY

A method for discovering a path of network traffic that travels from a source host to a destination host is disclosed. The method involves, at the source host, generating probe packets that have the same load balancing parameters as packets of an application that generates application packets for transmission from the source host to the destination host and a path discovery signature comprised of bits from at least one of the network layer header and the transport layer header. The method also involves transmitting the probe packets from the source host to the destination host. In some embodiments, the steps of this method are performed when program instructions contained in a computer-readable storage medium are executed by one or more processors.

Another embodiment of a method for discovering a path of network traffic that travels from a source host to a destination host is disclosed. The method involves, at the destination host, recognizing a path discovery signature in a probe packet that is received at the destination host, wherein the path discovery signature is comprised of bits from at least one of the network layer header and the transport layer header of the probe packet and wherein the probe packet has the same load balancing parameters as packets of an application that are generated for transmission from the source host to the destination host. The method also involves directing the probe packet to a path discovery controller instead of to a network layer and transport layer protocol stack of the destination host. In some embodiments, the steps of this method are performed when program instructions contained in a computer-readable storage medium are executed by one or more processors.

In another embodiment, a system for discovering a path of network traffic that travels from a source host to a destination host is disclosed. The system includes a probe generator module configured to generate probe packets that have 1) the same load balancing parameters as packets of an application that generates application packets for transmission from the source host to the destination host and 2) a path discovery signature comprised of bits from at least one of the network layer header and the transport layer header of the probe packets. In an embodiment, the system also includes a reply receiver configured to generate path information from reply packets that are received in response to the probe packets, a path discovery filter configured to recognize a path discovery signature in the reply packets and to direct the reply packets to the reply receiver instead of to a network layer and transport layer protocol stack of the source host, and a filter controller configured to program the path discovery filter to recognize the path discovery signature in the reply packets.

Another embodiment of a system for discovering a path of network traffic that travels from a source host to a destination host is disclosed. The system includes a probe receiver configured to generate a reply packet in response to a received probe packet and a path discovery filter configured to recognize a path discovery signature in a probe packet that is received at the destination host, wherein the path discovery signature is comprised of bits from at least one of the network layer header and the transport layer header of the probe packet and wherein the probe packet has the same load balancing parameters as packets of an application that are generated for transmission from the source host to the destination host and direct the probe packet to the probe receiver instead of to a network layer and transport layer protocol stack of the destination host. The system also includes a reply generator configured to generate a reply packet in response to a probe packet that is directed to the probe receiver instead of to the network layer and transport layer protocol stack.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 6A illustrates well known network layers as defined by the Open Systems Interconnection (OSI) model and the Defense Advanced Research Projects Agency (DARPA).

FIG. 7 depicts a functional block diagram of a software-based path discovery module that is configured to implement path discovery.

FIG. 8 is a process flow diagram of a method for discovering a path of network traffic that travels from a source host to a destination host.

FIG. 10 depicts a computer that includes a processor, memory, and a communications interface.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
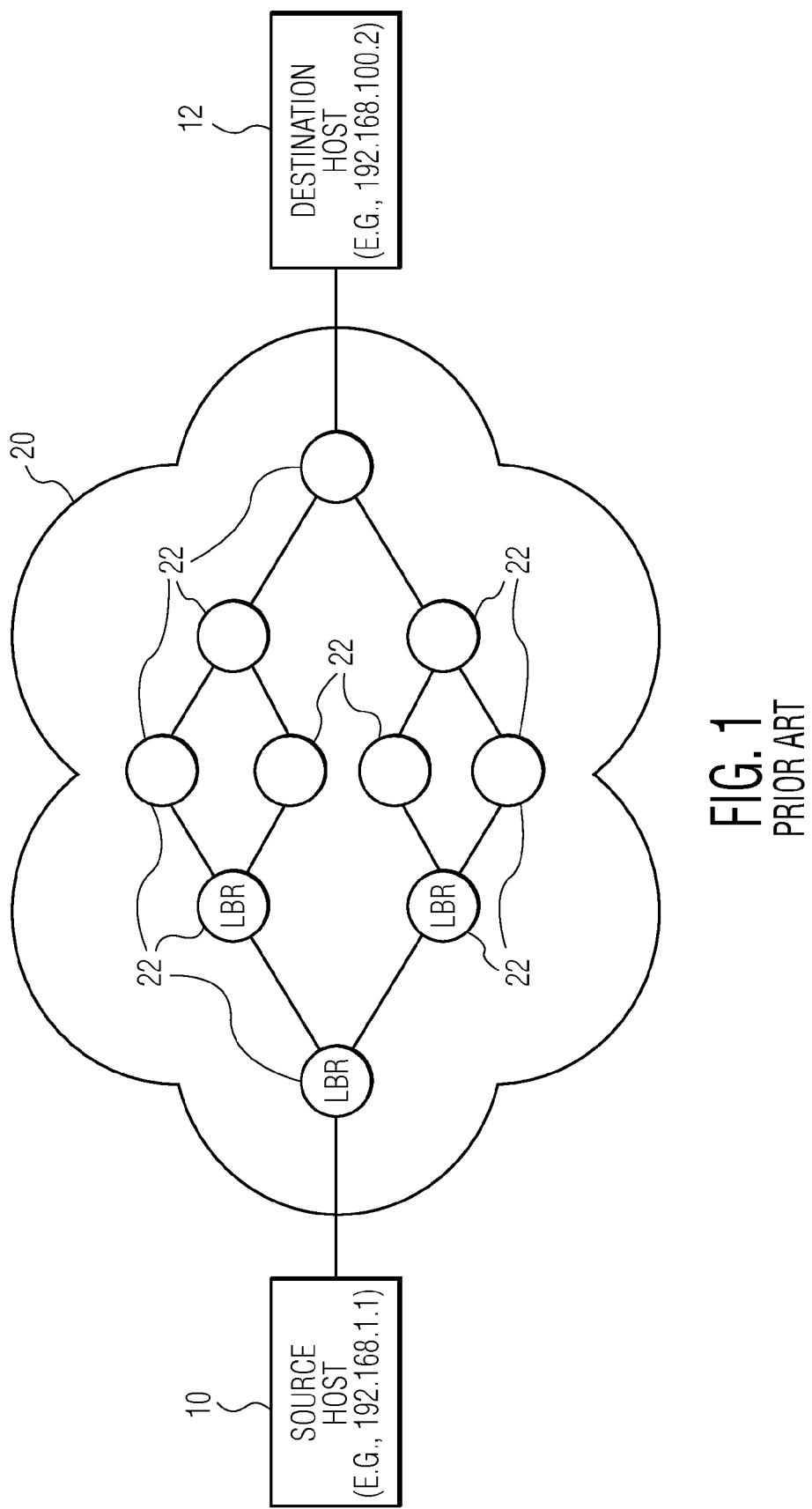
FIG. 1 depicts a network topology that includes a source host and a destination host and a network of multiple routers that connect the source host to the destination host.

FIG. 1 depicts a network topology that includes a source host 10 and a destination host 12 and a network 20 of multiple routers 22 that connect the source host to the destination host. In the embodiment of FIG. 1, the routers are connected to form a diamond architecture that provides multiple paths between the source host and the destination host. Additionally, at least three of the routers are load balancing routers that can distribute traffic between next hop routers on, for example, a per-packet basis, a per-destination basis, or a per-flow basis. For example, the routers identified as "LBR" are load balancing routers.

As is known in the field, per-flow load balancing is typically implemented based on the "five-tuple" of header fields of IP packet traffic. The five-tuple of header fields includes the protocol (also referred to as the transport protocol ID), the source IP address, and the destination IP address from the IP header and the source port and destination port from the transport layer header, e.g., from either the Transmission Control Protocol (TCP) header or the User Datagram Protocol (UDP) header. Although per-flow load balancing typically relies on the five-tuple of header fields, it is possible that other parameters could be used in addition to, or instead of, the five-tuple for per-flow load balancing.

As mentioned above, there are various known techniques for discovering the path or paths between a source host and a destination host, such as the source host 10 and destination host 12 shown in FIG. 1. Techniques for discovering the path or paths between a source host and a destination host include, for example, "classic traceroute," "Paris traceroute," and "tcptraceroute," and each traceroute technique involves generating probe packets that are transmitted into the network with different embedded values that enable corresponding reply packets to be identified. Additionally, the probe packets are sent with increasing time-to-live (TTL) values in order to identify each subsequent hop in the network. The header structures of probe packets for classic traceroute, Paris traceroute, and tcptraceroute are described below.

Figure 2:
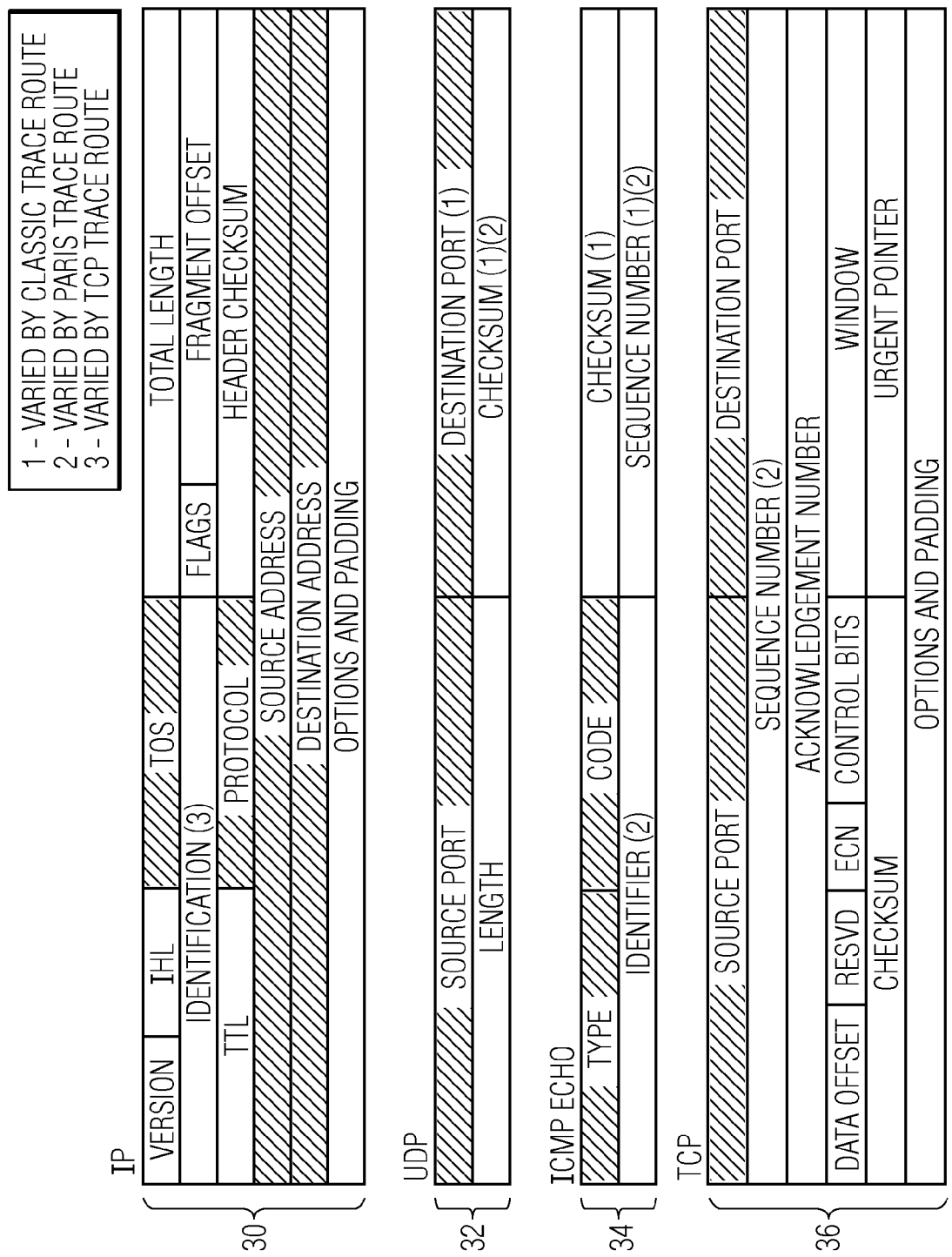
FIG. 2 depicts the header structures for probe packets that are used in classic traceroute, Paris traceroute, and tcptraceroute.

FIG. 2 depicts the header structures for probe packets that are used in classic traceroute, Paris traceroute, or tcptraceroute. In particular, FIG. 2 depicts the IP header 30, the UDP header 32, the ICMP Echo header 34, and the TCP header 36 that may be used to form traceroute probe packets for each traceroute technique. As shown in FIG. 2, the IP header includes a version field, and Internet header length (IHL) field, a type of service (TOS) field, a total length field, an identification field, a flags field, a fragment offset field, a time-to-live (TTL) field, a protocol field, a header checksum field, a source address field, a destination address field, and an options and padding field. The UDP header includes a source port field, a destination port field, a length field, and the checksum field. The ICMP Echo header includes a type field, a code field, a checksum field, an identifier field, and a sequence number field. The TCP header includes a source port field, a destination port field, a sequence number field, an acknowledgement number field, a dataoffset field, a reserved field, an explicit congestion notification (ECN) field, a control bits field, a window size field, a checksum field, an urgent pointer field, and a padding and options field. In all of the traceroute tools, the source address and the destination address of the probe packets are set to the source host and the destination host.

In FIG. 2, fields typically used for per-flow load balancing are identified with cross hatching. The fields typically used for per-flow load balancing include the type of service (TOS) field, the protocol field, the source address, and destination address in the IP header and the first four bytes of the transport layer header, e.g., the source port and destination port in UDP and TCP. In classic traceroute, the probe packets use UDP/IP or ICMP Echo/IP. When UDP/IP is used, the source port of probe packets can be set to, for example, 33434 and the destination port of the probe packets is typically set to an unused or unknown port number, for example, in the range of 33434-33534. The destination port and checksum are varied to identify the packets as probe packets (as indicated by key code (1)). For example, the destination port is incremented by one for each subsequent probe packet. When ICMP Echo is used, the checksum and sequence number are varied to identify the packet (as indicated by key code (1)).

In Paris traceroute, the probe packets may also use UDP/IP or ICMP Echo/IP. However, in Paris traceroute, the fields used for per-flow load balancing are held constant to establish a flow that can identify a path through the network and then at least one of the transport layer fields is varied to create a new flow that will travel a new path through the network. The checksum (UDP) or the identifier and sequence number (ICMP Echo) are used as a probe packet identifier (as indicated by key code (2)).

In tcptraceroute, the probe packets use TCP/IP and the identification field in the IP header is varied to identify the probe packets (as indicated by key code (3)). Additionally, the destination port is typically set to port 80 (which corresponds to HTTP).

As described above, the known traceroute tools use various manipulations of the header fields 30, 32, 34, and 36 for path discovery. However, in the case of a more complex network that includes multiple paths that are influenced by load balancing routers, the known traceroute tools are not effective in identifying the actual path taken by the probe packets. Paris traceroute is able to identify all of the possible paths between a source host and a destination host. However, the Paris traceroute tool is not able to specify which particular path, amongst multiple different possible paths, is the actual path traveled by packets that are generated from a user application such as HTTP that operates at, for example, the application layer to communicate data from the source host to the destination host.

In accordance with an embodiment, a technique for path discovery involves using probe packets that have the same per-flow load balancing parameters as a user application and that have a special path discovery signature to differentiate the probe packets from user application packets. The special path discovery signature is used at the destination host to identify the probe packets early on in the packet processing so that the probe packets can be used for path discovery without passing through the standard network layer and transport layer protocol stack. Because the probe packets have the same load balancing parameters as the user application, the probe packets will travel the same path as the user application packets and because the probe packets bypass the standard network layer and transport layer protocol stack at the destination host, the probe packets will not disrupt the protocol processing of the user application packets that are received at the destination host.

In an embodiment, the probe packets have the same five-tuple as user application packets and have a special path discovery signature that includes bits from the identification field of the IP header and bits from the sequence number field (TCP) or checksum field (UDP) of the transport layer header. The probe packets are injected into the network with varied TTL values to discover the actual path of the user application traffic through the network. Any probe packets that reach the destination host are identified based on their special path discovery signature and made to bypass the network layer and transport layer protocol stack (e.g., the TCP/IP stack) so that the probe packets do not disrupt the network layer and transport layer protocol processing of the user application packets.

Figure 3A:
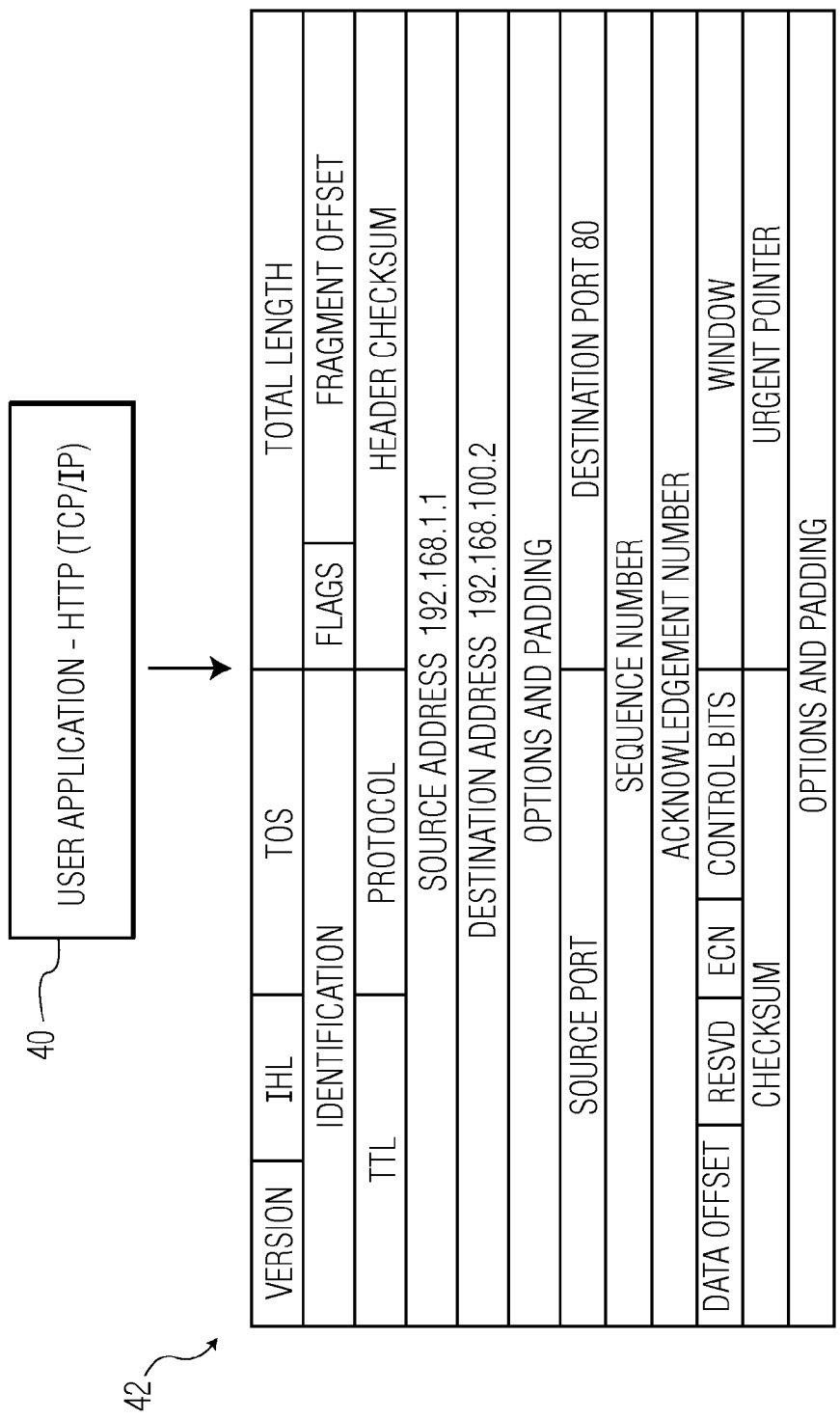
FIG. 3A illustrates a user application and a corresponding TCP/IP packet that is generated for communication from a source host to a destination host.

An embodiment of the path discovery technique is now described with reference to FIGS. 3A-3B, which illustrate an application packet and probe packets that are generated for a user application and various traceroute tools, respectively. FIG. 3A illustrates a user application 40 that causes TCP/IP packets to be generated for communication from a source host to a destination host. The user application may be any application that uses TCP/IP, such as, for example, HTTP. In the example of FIG. 3A, a user application packet 42 has a protocol of IPv4, a source address of 192.168.1.1, a destination address of 192.168.100.2, a source port that is used by the user application, and a destination port of 80 (port 80 corresponds to HTTP). In an embodiment, the source port is an ephemeral port number assigned by the TCP/IP stack when the application creates the socket.

As described above, various traceroute tools can be used to discover the paths in a network that could be taken by the packets of the user application 40. FIGS. 3B and 3C illustrate probe packets that could be used to discover paths between the source host and the destination host using Paris traceroute and tcptraceroute, respectively.

Figure 3B:
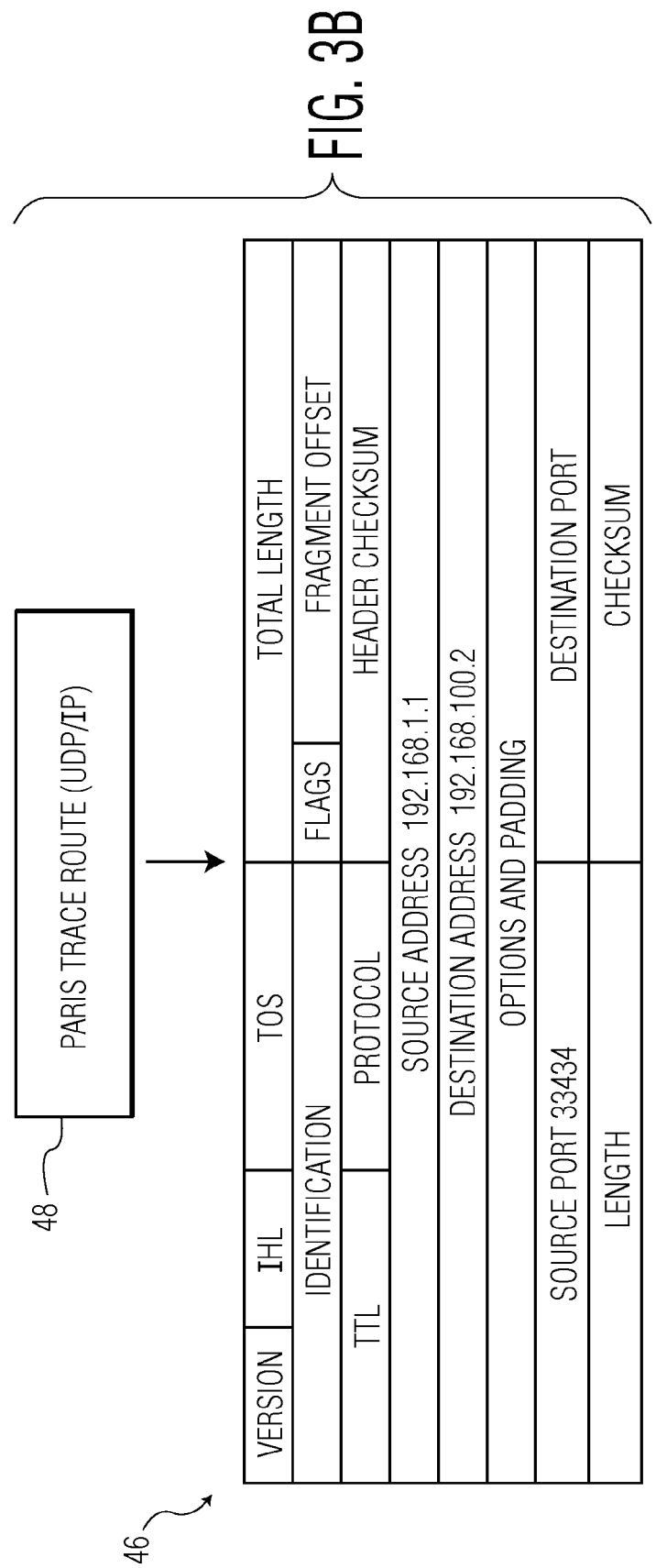
FIG. 3B illustrates the Paris traceroute tool and a corresponding probe packet that is generated by the Paris traceroute tool for path discovery.
Figure 3C:
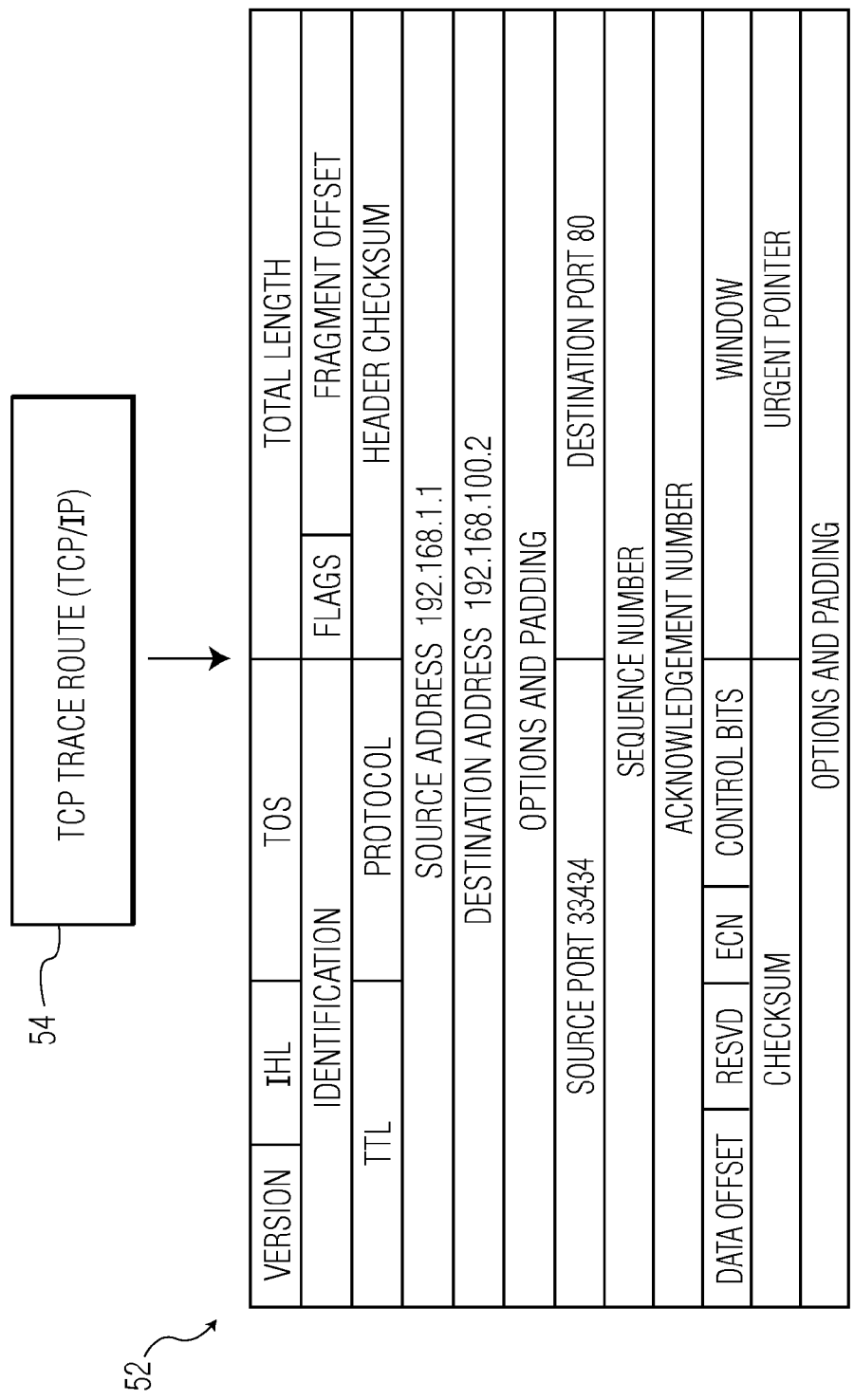
FIG. 3C illustrates the tcptraceroute tool and a corresponding probe packet that is generated by the tcptraceroute tool for path discovery.

FIG. 3B illustrates a probe packet 46 that is generated by the Paris traceroute tool 48 to discover paths between the same source host and destination host that are used by the user application 40. The probe packet is a UDP/IP packet that has the same source address and destination address as the user application packet 42, e.g., SA: 192.168.1.1. and DA: 192.168.100.2. The source port is 33434 (designated as traceroute) and the destination port is set to an unused or uncommon port number and varied to create different flows. The checksum field is set to a unique value for each flow to identify the packet as a probe packet of a particular flow. Because the values of the source port and destination port of the probe packet do not match the values of the source port and the destination port of the user application packet, there is no assurance that the probe packet and user application packet will travel the same path in the presence of per-flow load balancing routers.

FIG. 3C illustrates a probe packet 52 that is generated by the tcptraceroute tool 54 to discover paths between the same source host and destination host that are used by the user application. The probe packet is a TCP/IP packet that has the same source address and destination address as the user application packet 42. In the example of FIG. 3C, the source port is set to 33434 (designated as traceroute), and the destination port is set to 80 (designated as HTTP). The identification field in the IP header is set to a unique value to identify the packet as a probe packet. Again, because the values of the source port and destination port of the probe packet do not match the values of the source port and the destination port of the user application packet, there is no assurance that the probe packet and user application packet will travel the same path in the presence of per-flow load balancing routers. Additionally, although the destination port value (80: HTTP) of the TCP traceroute probe packet matches the destination port value of the user application, the destination port of the probe packet only matches the destination port of the user application packets when the user application utilizes HTTP and the five-tuple of the probe packet is still not the same as the five-tuple of the user application packet.

Figure 3D:
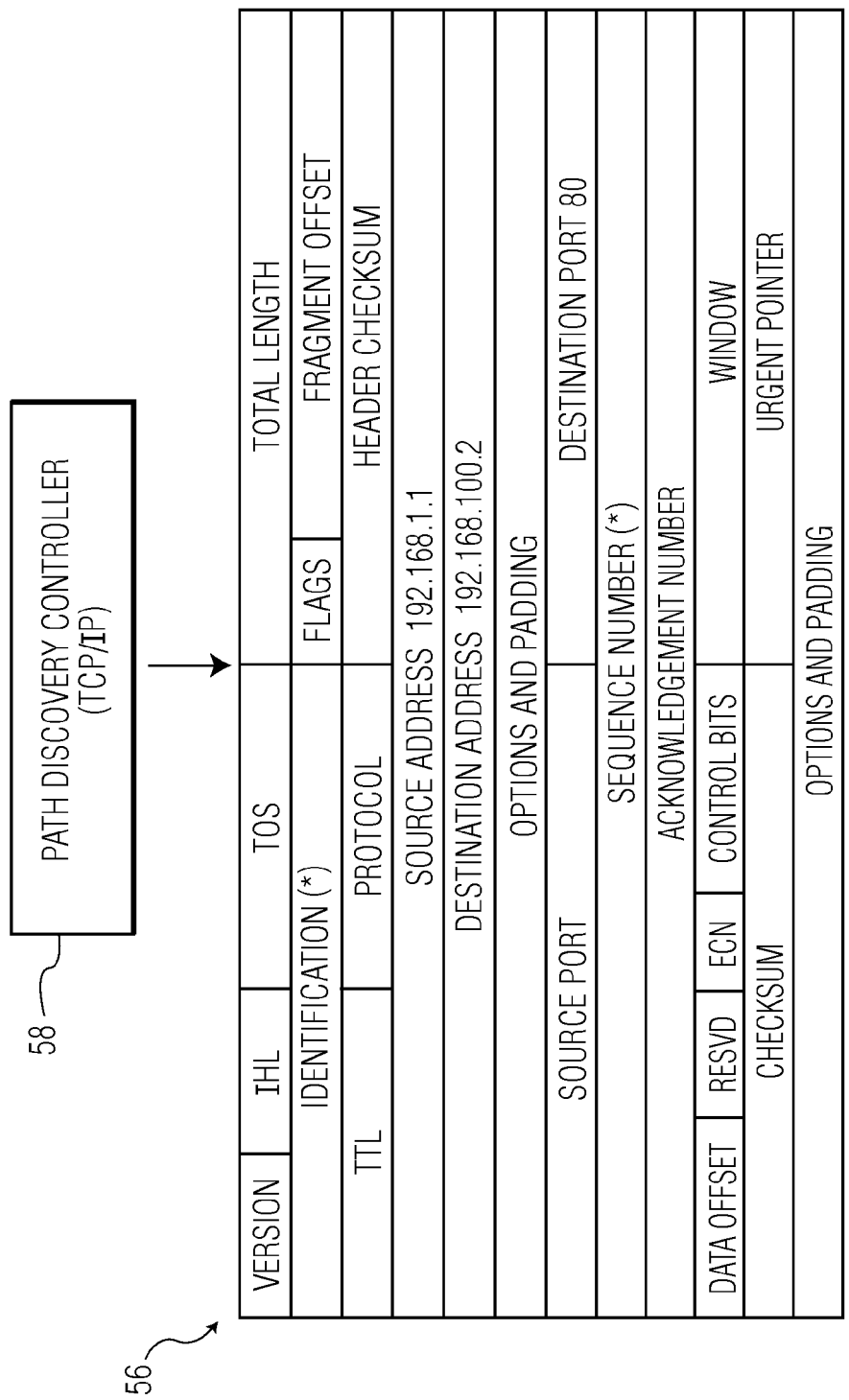
FIG. 3D illustrates an embodiment of a path discovery controller and a corresponding probe packet that is generated by the path discovery controller to discover the actual path that is taken by packets of the user application of FIG. 3A.

FIG. 3D illustrates an embodiment of a probe packet 56 that is generated by a path discovery controller 58 to discover the actual path that is taken by the packet 42 of the user application 40 of FIG. 3A. With reference to FIG. 3D, the probe packet is a TCP/IP packet that has the same five-tuple as the user application packet. In particular, the protocol field is IPv4, the source address is 192.168.1.1, the destination address is 192.168.100.2, the source port is the same as the port number used by the user application, and the destination port is 80. In an embodiment, bits from the identification field in the IP header and bits from the sequence number field in the TCP header are used to form a path discovery signature to uniquely identify the packet as a probe packet (as indicated by the "(*)" in the identification and sequence number fields). Because the probe packet has the same five-tuple as the user application packet, the probe packet will travel the same path as the user application packet in the presence of per-flow load balancing routers. Additionally, the path discovery signature in the probe packet allows the probe packet to be filtered at the destination host as is described in more detail below.

Figure 4A:
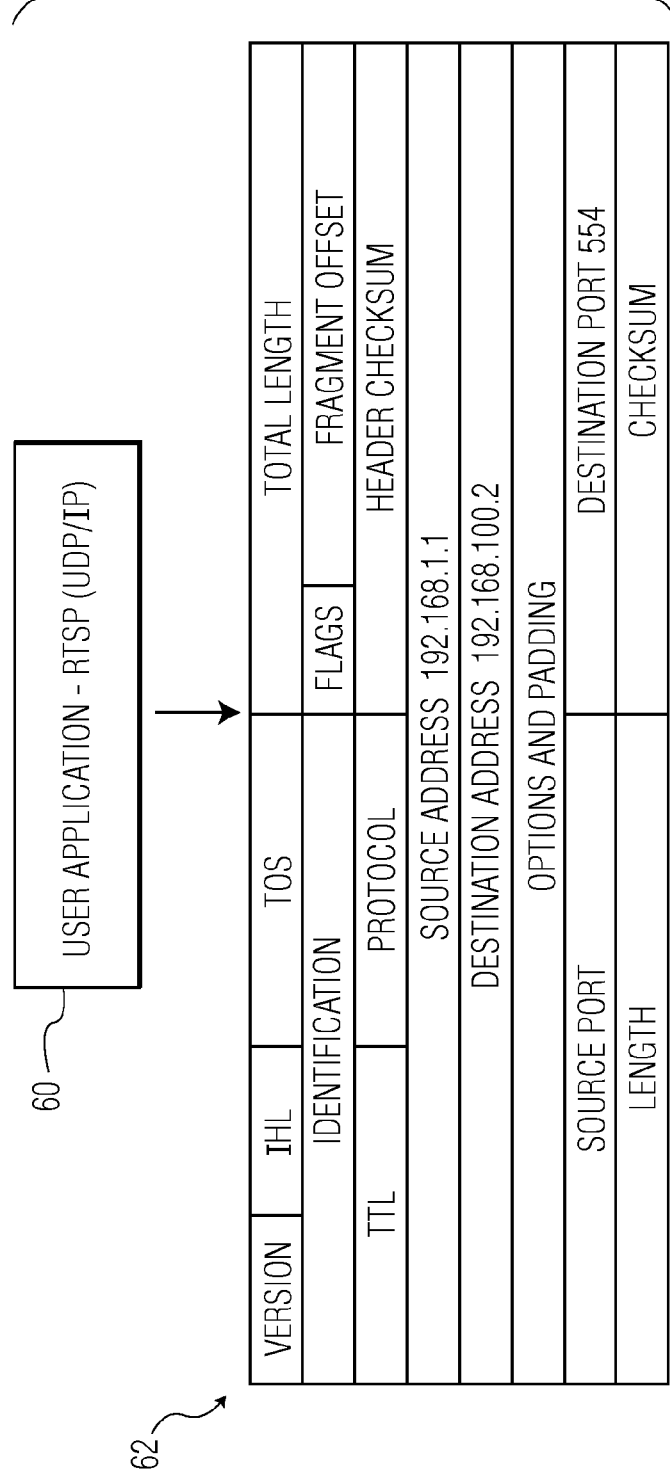
FIG. 4A illustrates a user application and a corresponding UDP/IP packet that is generated for communication from a source host to a destination host.
Figure 4B:
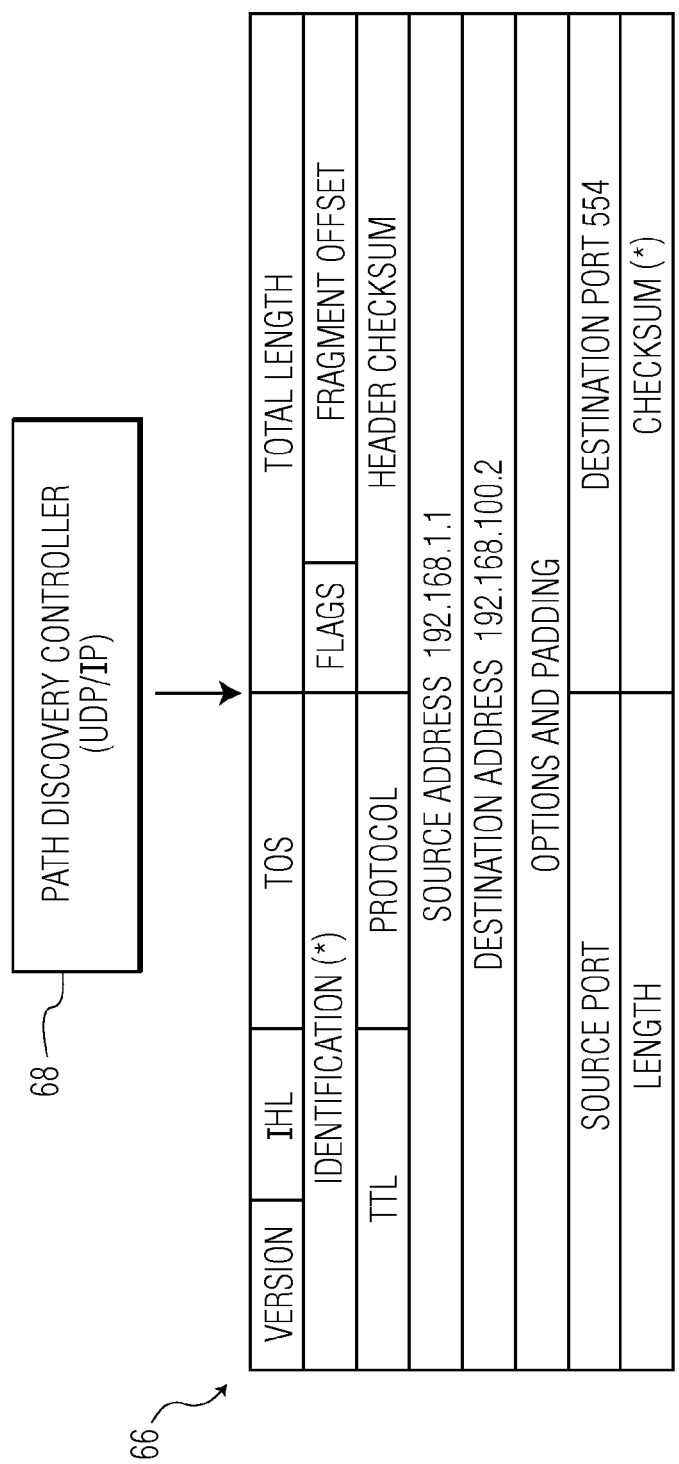
FIG. 4B illustrates an embodiment of a path discovery controller and a corresponding probe packet that is generated by the path discovery controller to discover the actual path that is taken by packets of the user application of FIG. 4A.

In the example of FIGS. 3A and 3D, the user application 40 uses TCP/IP packets to communicate data from the source host to the destination host. In another embodiment, the user application may use a different transport layer protocol, such as UDP, to communicate data from the source host to the destination host. FIGS. 4A and 4B illustrate an embodiment of the path discovery technique when the user application uses UDP at the transport layer instead of TCP. With reference to FIG. 4A, the user application 60 is an application such as Real-time Streaming Protocol (RTSP), which uses UDP/IP packets to communicate data from the source host to the destination host. In the example of FIG. 4A, a user application packet 62 has a protocol field of UDPv4, a source address of 192.168.1.1, a destination address of 192.168.100.2, a source port used by the user application, and a destination port of 554 (designated for RTSP). In an embodiment, the source port is an ephemeral port number assigned by the TCP/IP stack when the application creates the socket.

If conventional Paris traceroute or tcptraceroute were used to discover the path or paths taken by packets of the user application 60 of FIG. 4A, the probe packets would be the same as the those described above with reference to FIGS. 3B and 3C, respectively, and the five-tuple of the probe packets would not be the same as the five-tuple of the user application packets 62. Again, because the values of the five-tuple of the probe packets is not the same as the five-tuple of the user application packets, there is no assurance that the probe packets will travel the same path in the presence of per-flow load balancing routers.

FIG. 4B illustrates an embodiment of a probe packet 66 that is generated by a path discovery module 68 to discover the actual path that is taken by packets of the user application of FIG. 4A. The probe packet is a UDP/IP packet that has the same five-tuple as the user application packet. In particular, the protocol field is UDPv4, the source address is 192.168.1.1, the destination address is 192.168.100.2, the source port is the same as the source port number used by the user application, and the destination port is 554. In the embodiment of FIG. 4B, bits from the identification field in the IP header and bits from the checksum field in the UDP header are used to form a path discovery signature to uniquely identify the packet as a probe packet (as indicated by the "(*)" in the identification and checksum fields). Because the probe packet has the same five-tuple as the user application packet, the probe packet will travel the same path as the user application packet in the presence of per-flow load balancing routers. Additionally, the path discovery signature in the probe packet allows the probe packet to be filtered at the destination host as is described in more detail below.

Figure 5A:
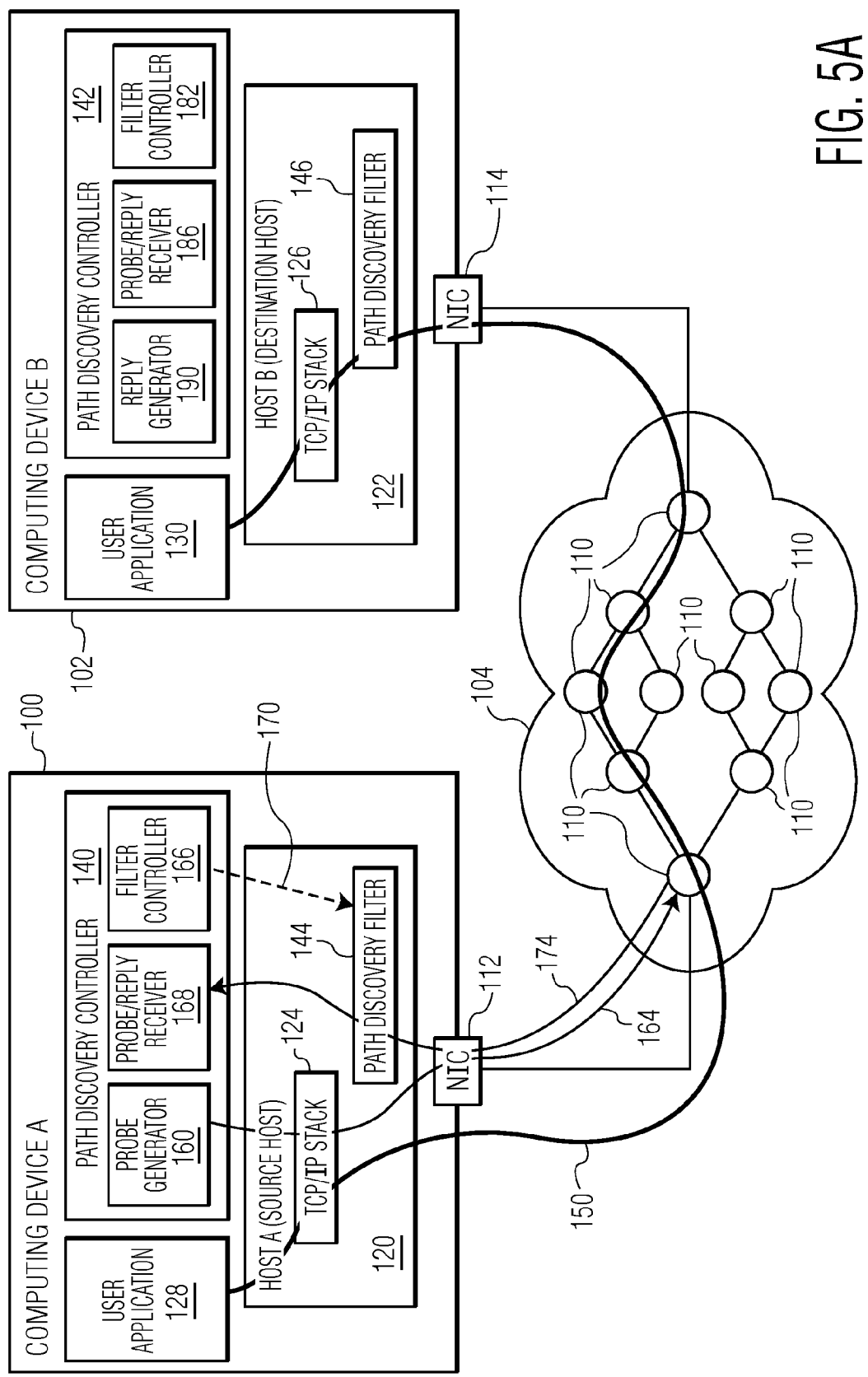
FIGS. 5A and 5B illustrate packet traffic between two computing devices connected to each other by a network that includes multiple routers.

Probe packets 56 and 66 that are used to discover the actual path of user application packets 42 and 62 are described above with reference to FIGS. 3D and 4B. An example implementation of a path discovery technique that uses such probe packets is now described with reference to FIGS. 5A and 5B. FIG. 5A depicts two computing devices 100 and 102 connected to each other by a network 104 that includes multiple routers 110 similar to the network shown in FIG. 1. Each computing device includes conventional elements of a network interface card (NIC) 112 and 114, a host 120 and 122, a TCP/IP stack 124 and 126, and a user application 128 and 130. Each computing device also includes a path discovery controller 140 and 142 and a path discovery filter 144 and 146 to implement a path discovery technique that identifies the actual path taken by traffic of the user application. In an embodiment, the IP address of host A (source host) is 192.168.1.1 and the IP address of host B (destination host) is 192.168.100.2.

In FIG. 5A, the path taken by packets of the user application is indicated by line 150 and is referred to as the user application path. As shown, the user application path goes from the user application 128 through the TCP/IP stack 124 and the NIC 112 on computing device A 100, through the network 104, and then through the NIC 114, through the packet discovery filter 146, the TCP/IP stack 126, and to the user application 130 on computing device B 102. That is, traffic generated by the user application on computing device A passes through the TCP/IP stack, then through the NIC of computing device A, then through the network, then in through the NIC of computing device B, then through the path discovery filter, then through the TCP/IP stack, ultimately arriving at the user application on computing device B.

An embodiment of a process for discovering the actual path taken by the user application packets that are communicated from host A (the source host) to host B (the destination host) is now described. The user application path 150 (e.g., the actual path) taken by packets of the user application is discovered using probe packets similar to those described with reference to FIGS. 3D and 4B. In an initial path discovery operation at computing device A 100, a probe generator 160 of the path discovery controller 140 triggers the generation of probe packets. In an embodiment, the probe packets have the same five-tuple as the user application packets as described above with reference to FIGS. 3A, 3D, 4A, and 4B. Generated probe packets pass through the TCP/IP stack 124 and the NIC 112 of computing device A and into the network 104 of routers 110, where the packets encounter the first router, which is a load-balancing router. Multiple probe packets are transmitted with different TTL values so that each hop along the path can be discovered. As is known in the field, TTL values are decremented at each hop and a router returns a message to the source host 120 when the TTL reaches zero. Given the varying TTL values of the probe packets, reply messages will be returned to host A (the source host) at each intermediate hop. The transmission of a probe packet, whose TTL value expires at the first router, is illustrated in FIG. 5A by line 164. In response to the expiration of the TTL value and as is known in the field, the router that receives such a probe packet will generate a reply message (e.g., ICMP message) in the form of an IP packet that is addressed to the source host and that includes the first eight bytes of the probe packet's transport layer header in the payload of the reply packet. For example, the first eight bytes of the TCP or UDP header is included in the payload of the reply packet. The content of the reply packet is used by a probe/reply receiver 168 of the path discovery controller to determine the path of the probe packets through the network. In an embodiment, the reply messages sent by the routers and destination host are ICMP messages of type "Time Exceeded." Additionally, in an embodiment, the path discovery controller at the receiving end returns ICMP messages in response to the probe packets. The ICMP messages returned by the path discovery controller may be of type "Time Exceeded" or "Destination Unreachable" or some other type depending on the implementation.

In an embodiment, the path discovery filter 144 is located low in the network stack, for example, between the NIC 112 (at the network interface layer) and the TCP/IP stack 124 (at the network and transport layers), and is programmed by a filter controller 166 of the path discovery controller 140 to recognize the path discovery signature that is carried in the payload of the reply packets. Programming of the path discovery filter 144 is illustrated in FIG. 5A by dashed line 170. In the embodiment of FIG. 5A, packets that are recognized as reply packets are diverted by the path discovery filter to the probe/reply receiver 168 of the path discovery controller. The transmission of a reply packet from the first router to the probe/reply receiver of computing device A is illustrated in FIG. 5A by line 174.

Figure 5B:
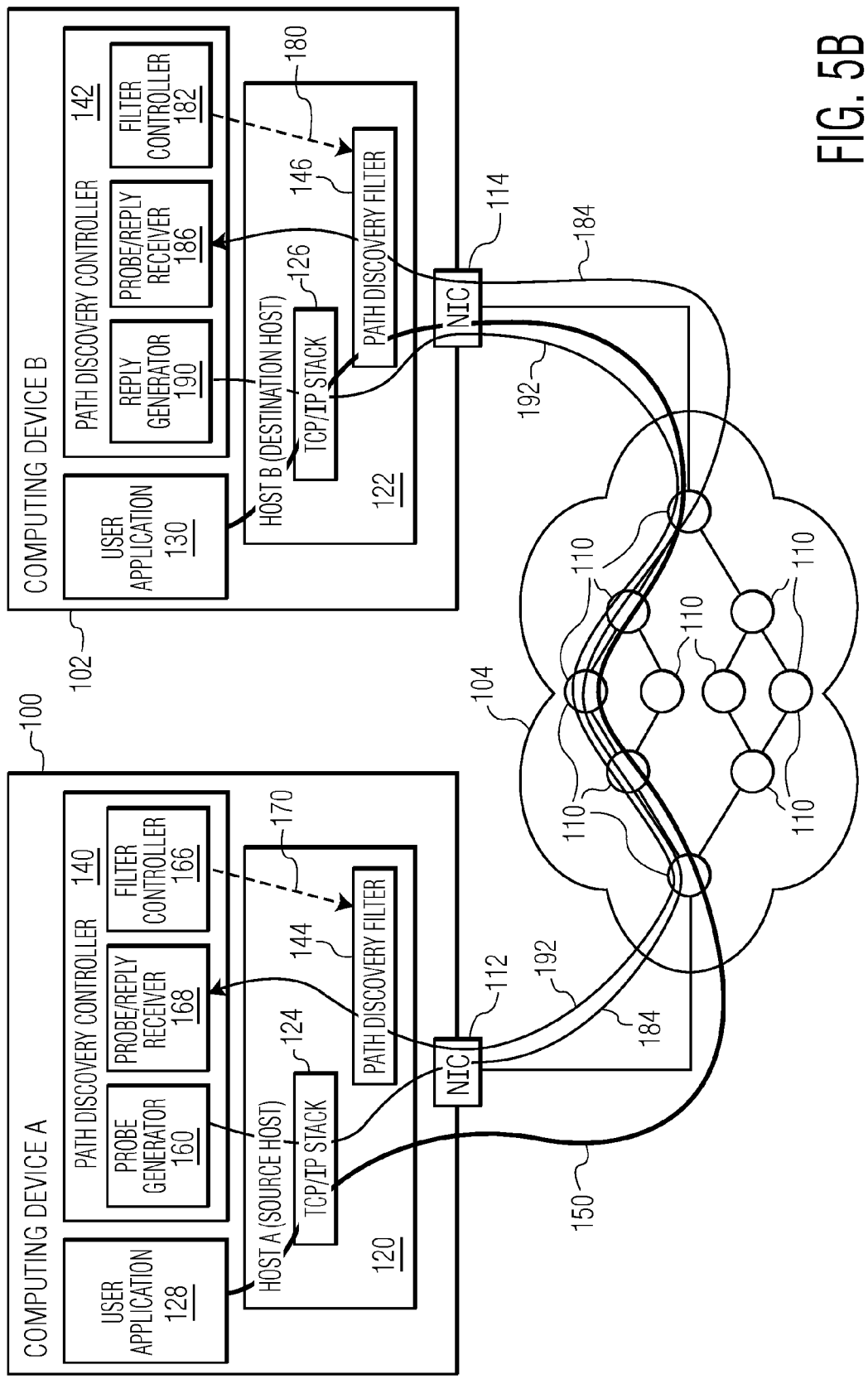

Although not shown in FIG. 5A, the process of transmitting probe packets and returning reply packets occurs at each hop along the path between the source host and the destination host. Eventually, the TTL values of the probe packets are increased to a point that the probe packets begin to reach host B 122 (the destination host). In order to prevent the probe packets from being processed by the TCP/IP stack 126 at host B, the path discovery filter 146 is located in host B below the TCP/IP stack. With reference to FIG. 5B, the path discovery filter of host B is located in the same place as the path discovery filter 144 in computing device A 100, that is, low in the network stack between the NIC 114 and the TCP/IP stack. Programming of the path discovery filter of host B is illustrated in FIG. 5B by dashed line 180 and involves a filter controller 182 programming the filter to recognize the path discovery signature that is carried in the header of the probe packets. The transmission of a probe packet all the way to host B is illustrated in FIG. 5B by line 184. Packets that are recognized as probe packets are diverted by the path discovery filter to a probe/reply receiver 186 of the path discovery controller, which then communicates with a reply generator 190 such that the reply generator triggers the generation of reply packets. The transmission of a reply packet from host B to host A is illustrated in FIG. 5B by line 192. In an embodiment, the reply packets include an IP header with the IP address of host A as the destination address, the IP address of host B as the source address, plus the first eight bytes from the transport layer header of the probe packets as the payload. Because the reply packets include the first eight bytes from the transport layer header of the probe packets, the reply packets transmitted from computing device B include the same path discovery signature as the probe packets and the same path discovery signature as the reply packets from the routers. The reply packets transmitted from computing device B make their way back to computing device A and are filtered as described above by the path discovery filter. The reply packets are used by the path discovery controller to generate path information that indicates the actual path of the user application traffic.

Figure 6B:
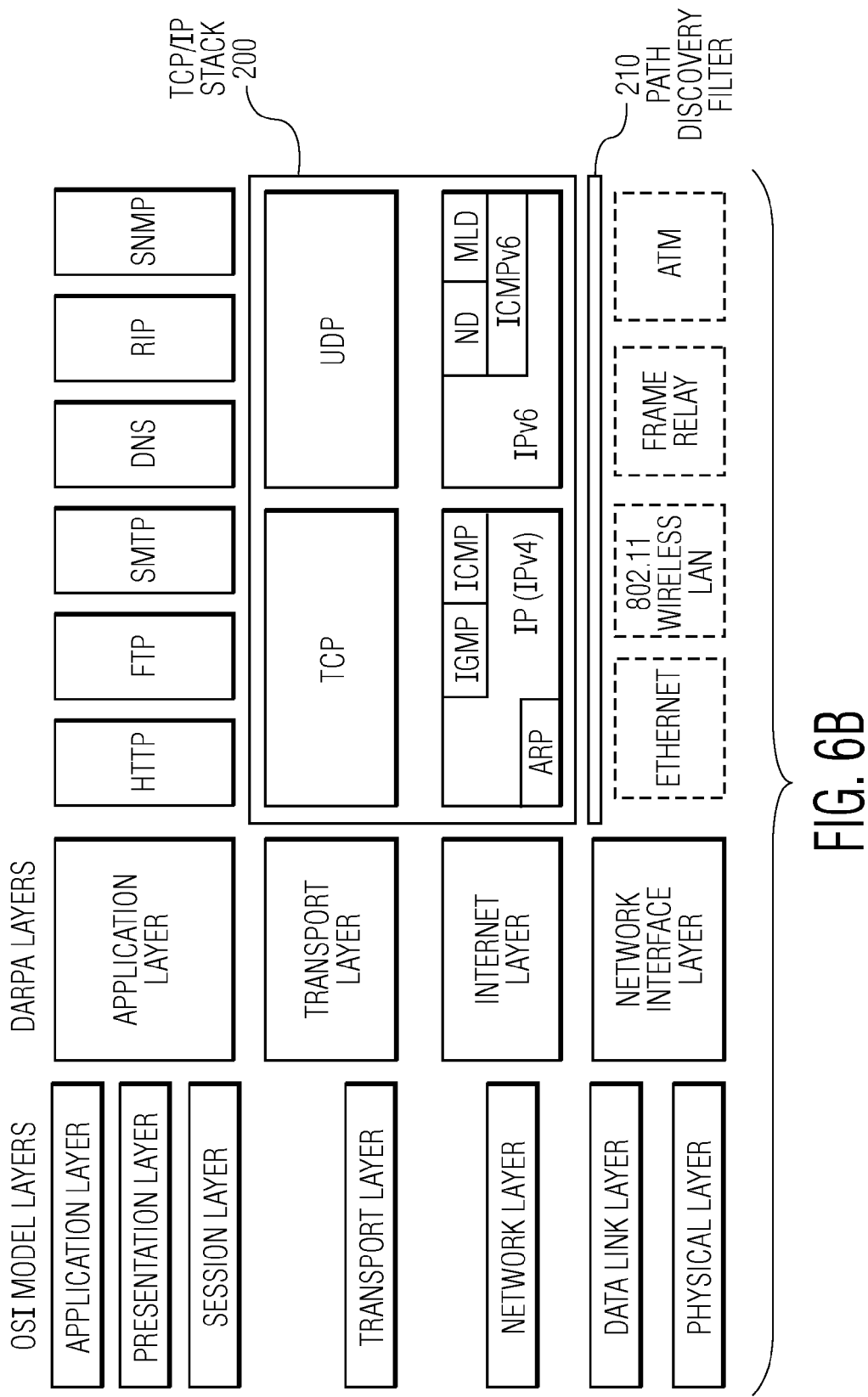
FIG. 6B depicts an embodiment of the location of a path discovery filter relative to the layers and protocols shown in FIG. 6A.

As described above with reference to FIGS. 5A and 5B, the path discovery filter of host B is located low in the network stack between the NIC and the TCP/IP stack. An example of a filter that is located low in the network stack between the NIC and the TCP/IP stack is described with reference to FIGS. 6A and 6B. FIG. 6A illustrates well known network layers as defined by the Open Systems Interconnection (OSI) model and the Defense Advanced Research Projects Agency (DARPA). As illustrated, the OSI layers include, from the lowest layer (bottom) to the highest layer (top), the physical layer, the data link layer, the network layer, the transport layer, the session layer, the presentation layer, and the application layer and the DARPA layers include, from the lowest layer (bottom) to the highest layer (top), the network interface layer, the Internet layer, the transport layer, and the application layer. Referring to the OSI model, protocols included at the network interface layer include Ethernet, 802.11 wireless LAN, Frame Relay, and ATM, protocols at the network layer include IP (IPv4), Address Resolution Protocol (ARP), Internet Group Management Protocol (IGMP), Internet Control Message Protocol (ICMP), IP version 6 (IPv6), Neighbor Discovery (ND), Multicast Listener Discovery (MLD), ICMPv6, at the transport layer, TCP and UDP, and at the session/presentation/application layers, HTTP, File Transfer Protocol (FTP), Simple Mail Transfer Protocol (SMTP), Domain Name System (DNS), Routing Information Protocol (RIP), and Simple Network Management Protocol (SNMP). In an embodiment, the modules, typically software modules, which implement the network layer and transport layer protocols are referred to collectively as the "TCP/IP stack" 200. The modules that implement the network layer and transport layer protocols may also be referred to collectively as the "TCP/UDP/IP stack." In either case, the TCP/IP stack and the TCP/UDP/IP stack are able to implement any of the known network layer and transport layer protocols. Additionally, in some embodiments, the bundle of software that includes the TCP/IP stack and various other commonly used higher layer applications, e.g., HTTP, FTP, SMTP, DNS, RIP, and SNMP, is referred to collectively as the "TCP/IP protocol suite."

As described with reference to FIGS. 5A and 5B, the path discovery filter is located low in the protocol stack, for example, below the TCP/IP stack. FIG. 6B depicts an embodiment of the location of a path discovery filter 210 relative to the layers and protocols shown in FIG. 6A. As shown in FIG. 6B, the path discovery filter is located between the data link/physical layers and the network layer so that the filter sees network traffic before the traffic is processed by the TCP/IP stack. In an embodiment, the path discovery filter recognizes the path discovery signature in the probe packets and diverts the probe packets directly to the path discovery module without the packets ever reaching the TCP/IP stack. Preventing the probe packets from reaching the TCP/IP stack is especially important when the probe packets have the same five-tuple as the user application packets because the path discovery signature in the probe packets could cause problems in the TCP/IP processing. For example, using the sequence number field for the path discovery signature could cause a TCP connection to fail. It is important that the path discovery filter be located before the TCP/IP stack at the destination host to avoid problems with TCP/IP processing of the user application traffic. In the embodiment described with reference to FIGS. 5A and 5B, the path discovery filter of host A (the source host) is also located before the TCP/IP stack. However, in other embodiments, the path discovery filter of host A (the source host) may be located higher up in the network stack, for example, at the transport layer or at the session/presentation/application layer.

In an embodiment, the path discovery controllers and the path discovery filters of each computing device are embodied within the respective computing device as software, for example, computer readable instructions stored on a non-transitory computer readable storage medium of the computing device. FIG. 7 depicts a functional block diagram of a software-based path discovery module 300 that is configured to implement the above described path discovery technique. The path discovery module includes a path discovery filter 302 and a path discovery controller 304 having a probe generator 306, a reply generator 308, a probe/reply receiver 310, and a filter controller 312. In an embodiment, the path discovery filter and the path discovery controller perform operations as described above with reference to FIGS. 3D, 4B, 5A, 5B, and 6B. In an embodiment, the path discover module, or some portion thereof, is delivered to a computing device as a software module for path discovery. For example, the path discovery module can be user-level software.

As described above, the user application 40, 60, 128, 130 can be any higher level application that uses an application layer protocol such as HTTP, RTSP, FTP, SMTP, DNS, RIP, SNMP, etc. With reference to FIGS. 3A and 4A, HTTP and RTSP are given as examples of the application layer protocols that can be used by the user application. However, other application layer protocols can be used.

In the embodiments described above with reference to FIGS. 3D and 4B, the path discovery signature is formed from bits from both the identification field in the IP header and from a field in the transport layer header. In other embodiments, bits from only one header and/or only one field are enough to differentiate the probe and reply packets from the packets of the user application. In an embodiment, multiple fields in the IP header only could be used for the path discovery signature.

In an embodiment, only bits from the first eight bytes of the transport layer header are used for the path discovery signature. This is important because ICMP reply packets generated by the routers in the network will automatically include only the first eight bytes of the transport layer header in the payload of reply packets.

In an embodiment, a host is an element that is identified by an IP address and that maintains a host-specific TCP/IP stack. For example, a host may be embodied as a single physical computing device or a host may be embodied as a virtual machine that is one of many virtual machines operating on the same physical computing device, with each virtual machine having its own IP address and maintaining its own TCP/IP stack.

FIG. 8 is a process flow diagram of a method for discovering a path of network traffic that travels from a source host to a destination host. At block 802, probe packets are generated at a source host. The probe packets having the same load balancing parameters as packets of an application that generates application packets for transmission from the source host to the destination host and a path discovery signature comprised of bits from at least one of the network layer header and the transport layer header. At block 804, the probe packets are transmitted from the source host to the destination host.

Figure 9:
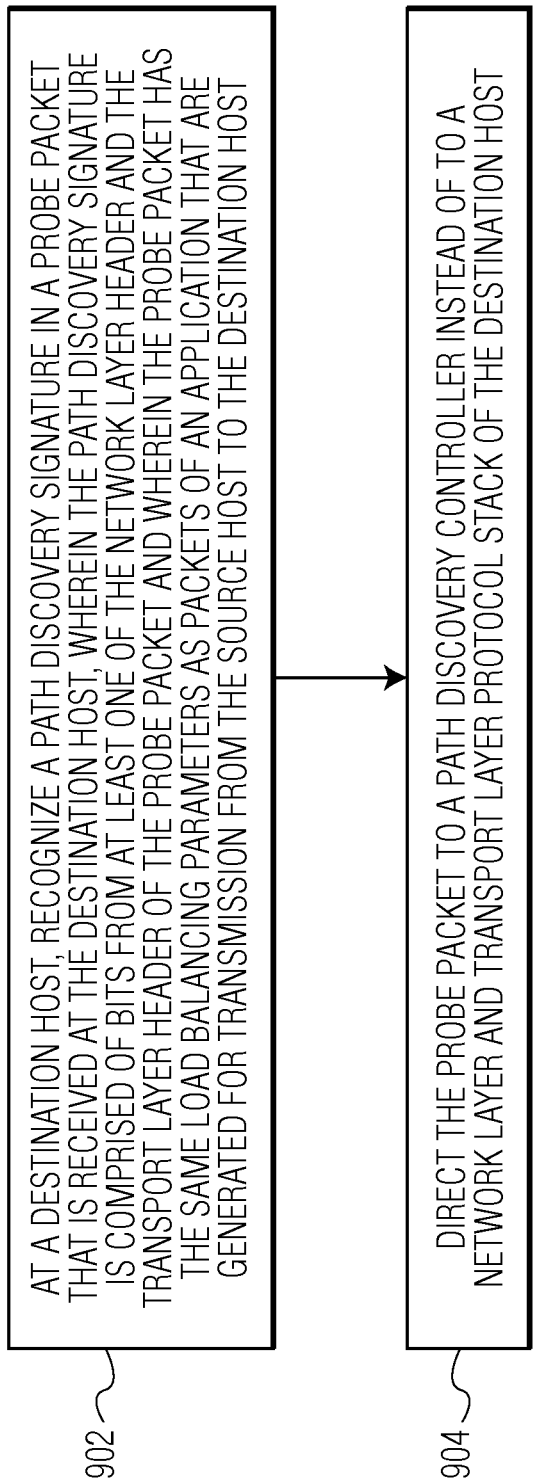
FIG. 9 is a process flow diagram of another method for discovering a path of network traffic that travels from a source host to a destination host.

FIG. 9 is a process flow diagram of another method for discovering a path of network traffic that travels from a source host to a destination host. At block 902, at the destination host, a path discovery signature is recognized in a probe packet that is received at the destination host, wherein the path discovery signature is comprised of bits from at least one of the network layer header and the transport layer header of the probe packet and wherein the probe packet has the same load balancing parameters as packets of an application that are generated for transmission from the source host to the destination host. At block 904, the probe packet is directed to a path discovery controller instead of to a network layer and transport layer protocol stack of the destination host.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer readable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In an embodiment, at least one of the functionalities described above is performed by a computing device. FIG. 10 depicts a computer 1000 that includes a processor 1002, memory 1004, and a communications interface 1006. The processor may include a multifunction processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for discovering a path of network traffic that travels from a source host to a destination host, the method comprising:
   at the source host, generating probe packets that have:
      a five-tuple of header fields that is identical to a corresponding five-tuple of header fields of packets that are generated by an application for transmission from the source host to the destination host; and a path discovery signature comprised of bits from at least one of a network layer header and a transport layer header of the probe packets; and transmitting the probe packets from the source host to the destination host;

at the source host:

recognizing a path discovery signature in reply packets that are received at the source host in response to the transmitted probe packets; and directing the reply packets to a path discovery controller instead of to a network layer and transport layer protocol stack of the source host.

2. The method of claim 1 further comprising determining path information from the received reply packets.

3. The method of claim 1 wherein each of the five-tuples includes a source IP address, destination IP address, protocol ID, source port, and destination port.

4. The method of claim 1 wherein the path discovery signature comprises bits from both the network layer header and the transport layer header.

5. The method of claim 4 wherein the bits from the network layer header comprise bits from an identification field and wherein the bits from the transport layer header comprise bits from the first eight bytes of the transport layer header.

6. A method for discovering a path of network traffic that travels from a source host to a destination host, the method comprising:

at the destination host;

recognizing a path discovery signature in a probe packet that is received at the destination host, wherein the path discovery signature is comprised of bits from at least one of a network layer header and a transport layer header of the probe packet and wherein the probe packet has a five-tuple of header fields that is identical to the five-tuple of header fields of packets that are generated by an application for transmission from the source host to the destination host; and directing the probe packet to a path discovery controller instead of to a network layer and transport layer protocol stack of the destination host when a path discovery signature is recognized.

7. The method of claim 6 further comprising:

at the destination host;

generating a reply packet in response to the probe packet; and transmitting the reply packet from the destination host to the source host.

8. The method of claim 6 wherein the destination host comprises a path discovery filter located below the network layer and transport layer protocol stack and wherein the method further comprises filtering incoming packets to identify probe packets and diverting identified probe packets from the network layer and transport layer protocol stack.

9. The method of claim 6 wherein the path discovery signature comprises bits from both the network layer header and the transport layer header.

10. The method of claim 9 wherein the bits from the network layer header comprise bits from an identification field and wherein the bits from the transport layer header comprise bits from the first eight bytes of the transport layer header.

11. A system for discovering a path of network traffic that travels from a source host to a destination host, the system comprising:

a probe generator configured to generate probe packets that have 1) a five-tuple of header fields that is identical to the five-tuple of header fields of packets that are generated by an application for transmission from the source host to the destination host and 2) a path discovery signature comprised of bits from at least one of a network layer header and a transport layer header of the probe packets;

a reply receiver configured to generate path information from reply packets that are received in response to the probe packets;

a path discovery filter configured to recognize a path discovery signature in the reply packets and to direct the reply packets to the reply receiver instead of to a network layer and transport layer protocol stack of the source host; and a filter controller configured to program the path discovery filter to recognize the path discovery signature in the reply packets.

12. The system of claim 11, wherein the path discovery filter is located below the network layer and transport layer protocol stack and wherein the path discovery filter is configured to filter incoming packets to identify the probe packets and to divert the probe packets from the network layer and transport layer protocol stack.

13. A system for discovering a path of network traffic that travels from a source host to a destination host, the system comprising:

a probe receiver configured to generate a reply packet in response to a received probe packet;

a path discovery filter configured to:

recognize a path discovery signature in a probe packet that is received at the destination host, wherein the path discovery signature is comprised of bits from at least one of a network layer header and a transport layer header of the probe packet and wherein the probe packet has a five-tuple of header fields that is identical to the five-tuple of header fields of packets that are generated by an application for transmission from the source host to the destination host; and direct the probe packet to the probe receiver instead of to a network layer and transport layer protocol stack of the destination host when a path discovery signature is recognized; and a reply generator configured to generate a reply packet in response to a probe packet that is directed to the probe receiver instead of to the network layer and transport layer protocol stack.

14. The system of claim 13 wherein the path discovery filter is located below the network layer and transport layer protocol stack and wherein the path discovery filter is configured to filter incoming packets to identify the probe packets and to divert the probe packets from the network layer and transport layer protocol stack.

15. A non-transitory computer readable storage medium containing program instructions for discovering a path of network traffic that travels from a source host to a destination host, wherein execution of the program instructions by one or more processors causes the one or more processors to perform steps comprising:

when acting as the source host, generating probe packets that have:

a five-tuple of header fields that is identical to the five-tuple of header fields of packets that are generated by an application for transmission from the source host to the destination host; and a path discovery signature comprised of bits from at least one of a network layer header and a transport layer header; and transmitting the probe packets from the source host to the destination host;
when acting as the destination host;
recognizing a path discovery signature in a probe packet that is received at the destination host, wherein the path discovery signature is comprised of bits from at least one of the network layer header and the transport layer header of the probe packet and wherein the probe packet has a five-tuple of header fields that is the same as the five-tuple of header fields of packets that are generated by an application for transmission from the source host to the destination host; and
directing the probe packet to a path discovery controller instead of to a network layer and transport layer protocol stack of the destination host.

16. The non-transitory computer readable storage medium of claim 15, further comprising, when acting as the source host:
recognizing a path discovery signature in reply packets that are received at the source host in response to the transmitted probe packets; and
directing the reply packets to a path discovery controller instead of to a network layer and transport layer stack of the source host; and
determining path information from the received reply packets.

17. The non-transitory computer readable storage medium claim 16, further comprising:
at the destination host, generating reply packets in response to the probe packet; and
transmitting the reply packets from the destination host to the source host.

18. The non-transitory computer readable storage medium of claim 17, further comprising a path discovery filter located below the network layer and transport layer protocol stack and wherein the path discovery filter is configured to filter incoming packets to identify the probe packets and to divert the probe packets from the network layer and transport layer protocol stack.

* * * * *